INVENTORS
JOHN W. SWINNERTON
VICTOR J. LINNENBOM

BY

ATTORNEY 3,150,516
ANALYSIS OF GASES IN A LIQUID SOLUTION
Victor J. Linnenbom, 1408 Ray Road, Hyattsville, Md., and John W. Swinnerton, 1969 Beddoo St., Alexandria, Va.
Filed Sept. 27, 1961, Ser. No. 141,222
5 Claims. (Cl. 73—19)
(Granted under Title 35, U.S. Code (1952), sec. 266)

The invention described herein may be manufactured and used by or for the Government of the United States of America for governmental purposes without the payment of any royalties thereon or therefor.

The present invention relates to gas chromatography and more particularly to the analysis of dissolved gases in a liquid solution.

Heretofore the various known methods used to analyze gases in solution have consisted of removal of the dissolved gases from the liquid by reduced pressure of vacuum techniques, followed by analysis of the gaseous mixture thus liberated. The analysis can be carried out conveniently by methods such as the well known Van Slyke technique, or by use of a mass spectrometer. The Van Slyke method requires large samples and takes considerable time for a complete analysis, while the mass spectrometer is a bulky expensive piece of equipment and requires advanced high vacuum techniques to be successful.

The present invention overcomes the disadvantages of prior art methods in that it provides a much more rapid method which allows a complete analysis to be carried out on a single small sample of liquid about one milliliter in volume. The method utilizes a small sample chamber in which the dissolved gases are stripped from solution by an inert gas which then carries the unknown gas mixture into a gas chromatography instrument for analysis. The system allows easy removal and cleaning of the sample chamber without interrupting the flow of a carrier gas through the rest of the apparatus and also permits injection of the liquid sample into the chamber while the carrier gas is flowing.

It is therefore an object of the present invention to provide a fast simple quantitative removal of dissolved gases from a small sample of liquid with a subsequent accurate analysis of the gaseous mixture.

Another object is to provide a simple relatively small instrument for carrying out gas analysis of gases dissolved in a liquid.

Still another object is to provide an instrument which has relatively few parts and yet highly efficient with analysis in a very short period of time.

Figure 1:
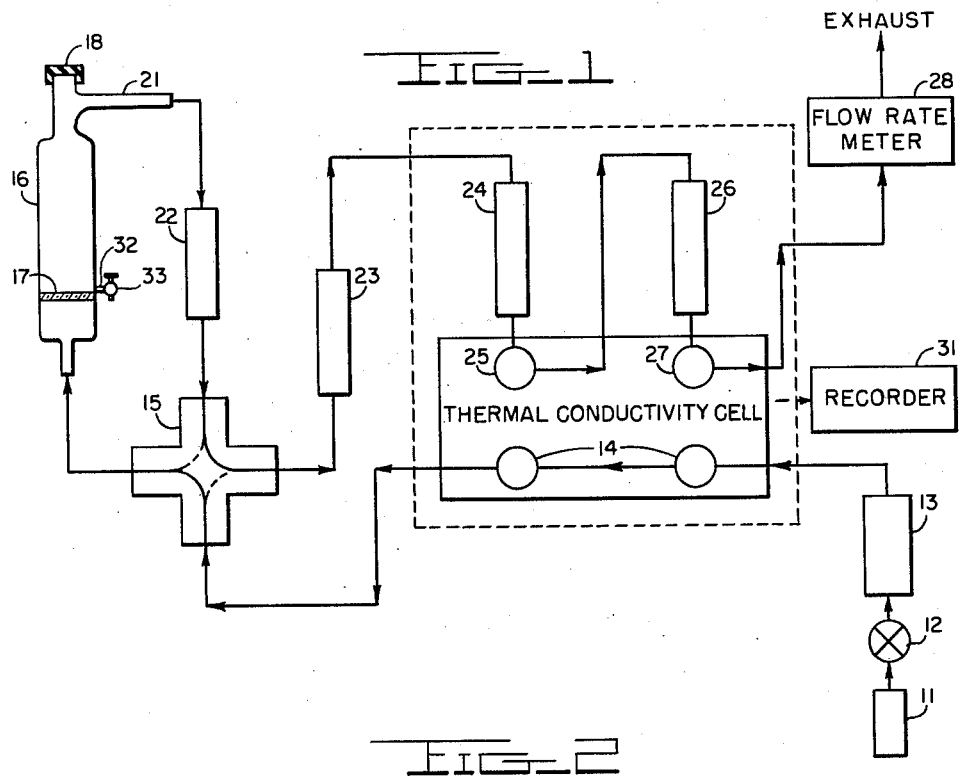
Figure 2:
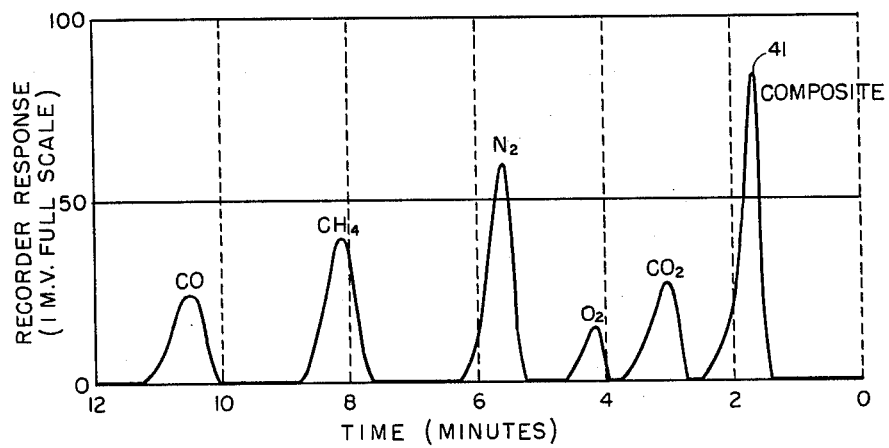

Other objects of this invention will become apparent from a more careful consideration of the following detailed description when taken together with the accompanying drawing, in which;

FIG. 1 is a schematic illustration of the system illustrating the relative parts; and FIG. 2 illustrates a record of a test in which several different gases in a test sample were recorded.

The present invention makes use of a well known Fisher gas partitioner and a recorder. The partitioner comprises two main components, the separation columns in which there occurs a repeated distribution or partition of the gases to be separated between a moving carrier gas and a fixed solid phase packed in the separation columns, resulting in an eventual separation. The other component is the thermal conductivity cell in which the amount of unknown gas in the carrier gas is measured by the difference between the thermal conductivities of the gas mixture and the pure gas carrier. To this well known instrument, a gas sample chamber which includes a glass frit therein is connected in the carrier gas line which is controlled by a four-way valve. The four way valve permits one to direct the carrier gas through the sample chamber to analyze a liquid sample and then to by-pass the sample chamber for the purpose of cleaning the chamber and preparing for another test. The carrier gas on passing through the glass frit in the sample chamber breaks up into many minute bubbles which on passing through the liquid sample strips the sample of any gases dissolved therein. Suitable drying agents are used in the carrier line between the sample chamber and the separation column to remove any water vapor from the gaseous mixture before the gaseous mixture is directed into the separation column of the gas partitioner. The separation column causes the gaseous components of the gaseous mixture to move through the column with individual velocities which are less than that of the carrier gas. The gaseous components emerge from the separation column one by one and are detected by the thermal conductivity cell which produces a voltage signal representative of the gas detected. The voltage signal is recorded by the recorder and the signals are then analyzed to determine the quantity of gas and the type in accordance with known recordings of the various types of gases.

Referring now to the drawing there is shown in FIG. 1 a schematic diagram of a system used for analyzing dissolved gases in an aqueous solution. The system makes use of an instrument known in the art as a Fisher gas partitioner manufacturer by Fisher Scientific Company, 711 Forbes Ave., Pittsburgh, Pa., or any other suitable gas chromatography instrument well known in the art. The system includes a gas line suitable for connection with a carrier gas container 11 such as helium or nitrogen depending on the gases desired to be determined. The carrier line has a valve 12 for controlling the gas flow which passes through a dryer 13 and then through thermal conductivity cells 14. From the conductivity cells, carrier gas lines are connected with a four-way valve 15 that controls the path that the carrier gas will take. As shown, the carrier gas will flow into the bottom of a chamber 16 which contains a glass frit 17 near the bottom thereof. The glass frit is of a well known type which can be fine, medium, or coarse, having a porosity of from about 10 to 175 microns depending on the gas analysis desired. The chamber is provided with a rubber self-sealing cap 18 which closes the chamber and through which a measured volume of aqueous solution can be injected into the chamber by a syringe fitted with a sharp needle. The chamber is provided with an outlet 21 at the top which is connected with a suitable dryer 22 which aids in removing water vapor from the gases passing through the line. A line from the dryer is connected with the four-way valve 15 and the other side of the valve is connected by a suitable line to a second dryer 23. A line from the dryer 23 is connected with a gas separation column 24 which is a four foot by one-quarter inch tube filled with 30% hexamethylphosphoramide on 60–80 mesh Columpak, or any other suitable separator and a thermal conductivity cell 25. The thermal conductivity cell 25 is suitably connected with a second gas separation column 26 which is a 7¾ foot by ¼ inch tube filled with 30–60 mesh molecular sieve 13x, or any other suitable separator and which is connected to thermal conductivity cell 27. The thermal conductivity cell 27 is connected with a flow meter which indicates the rate of flow of the gases and flow meter is then connected with an exhaust. A recorder 31 is electrically connected with an electrical bridge network including the thermal conductivity cells 14, 25 and 27 which records the outputs of each of the cells 25 and 27 to indicate the presence of various types of gases.

In operation, for example, to analyze an aqueous solution or organic fluid to determine the presence and amount of dissolved gases therein such as oxygen, nitrogen, carbon monoxide, carbon dioxide, etc. with the equipment as described above, a carrier gas such as helium is connected to the inlet line. The valve 12 is opened and the four-way valve 15 is positioned to permit the carrier gas to flow through the system and the sample chamber 16. The carrier gas passes through the four thermal conductivity cells and since the thermal cells are electrically connected as a balanced bridge the recorder will not record the presence of the carrier gas. A sample solution is injected into the sample chamber through the self sealing rubber cap. The carrier gas passing through the glass frit is broken up into minute bubbles and as the minute bubbles pass through the solution, the solution is stripped of all dissolved gases in a matter of seconds. The unknown gas mixture is carried along with the carrier gas and passes through drying columns 22 and 23 to remove all water vapor. The unknown gas mixture is then carried into the gas partitioner or separator 24 where separation of the gases is effected in the usual manner. After partial separation, the gases are carried into the thermal conductivity cell 25 where a change in thermal conductivity of the gas stream due to the presence of the unknown gas is detected by the conductivity cell 25 which sends a voltage signal 41 to the recorder proportioned in magnitude to the amount of the total of the unknown gases. The carrier gas and unknown gases are then carried into a second partitioner or separator column 26 where the unknown gases are finally separated into various components and discharged separately into the thermal conductivity cell 27 due to the different times required in passing through the separator. The separate unknown gases admitted into the conductivity cell 27 will send separate voltage signals to the recorder proportional in magnitude to the amount of the unknown gas as shown in FIG. 2. Several gases in the same sample will thus produce a series of sharply rising identifying peaks with somewhat less sharp tails. The area under a given peak is proportional to the quantity of unknown gas passing through the cell. After the gases pass through cell 27, they are exhausted into any suitable area. Based on a previous calibration using known samples of known gases which produce characteristic peaks, each indicated peak can be converted to the quantity and type of gas.

For the determination of the amount of hydrogen in a solution, a separate sample must be used with a different carrier gas such as nitrogen wherein the test is run as described above for the determination of the other unknown gases. The liquid sample is stripped of all gases dissolved therein and stripped gases are forced along with the carrier gas. As the gases pass through dryers 22 and 23 the gases are dryed and then passed through the first separator column. Most of the gases from the first separator column will be admitted into the thermal conductivity cell 25 and unbalance the bridge to produce a signal on the recorder according to a composite of gases. The stripped gases and the carrier gas will then be directed through the second separator column 26, where the gases are separated and then admitted into the thermal conductivity cell 27 separately to cause an unbalance in the bridge and the individual gases will be recorded accordingly as they pass into the conductivity cell 27. The gases will then pass out through the flow meter and be exhausted. It has been determined that dissolved gases in concentration as low as 0.30 p.p.m. can be measured. For the illustrated example, the sample chamber is a glass tube of 11 mm. inside diameter with a height of about 12 cm. with a coarse fritted section. Liquid samples of about three cc. are large enough to carry out the analysis illustrated above, and samples with dissolved gas concentrations as low as 0.30 p.p.m. in one to two milliliter are sufficient to be analyzed.

In order to run repeated analyses a drain 32 with a control valve 33 has been added to the chamber near the glass frit in order to drain the liquid out of the chamber after a test has been completed. In draining the chamber, the drain valve 33 is rotated such that the valve is open and the carrier gas is continued to be fed through the chamber which aids in forcing the liquid from the chamber. During cleaning of the chamber the carrier gas is directed away from the chamber by the four-way valve which feeds the gas directly to the gas partitioner and the chamber can be removed and cleaned with the carrier gas still flowing. After cleaning, the four-way valve is rotated to pass the carrier gas through the test chamber and then a new sample can be injected into the test chamber and a new analysis run. In this manner analysis of successive samples can be run and cleaning of the chamber can be carried out without any long delay between test.

The system of the present invention can be used for analysis of irradiated aqueous solutions, oceanographic and water pollution studies as well as for solutions other than aqueous where the determination of dissolved gases is important. Such a system affords rapid, reproducible and accurate analysis of small samples of liquids.

Obviously many modifications and variations of the present invention are possible in the light of the above teachings. It is therefore to be understood that within the scope of the appended claims the invention may be practiced otherwise than as specifically described.

What is claimed is:
1. In a system for extracting dissolved gases from a liquid sample and subsequently analyzing the extracted gases comprising a chamber, an inlet and an outlet in said chamber for connecting said chamber with a carrier gas line, a glass frit secured within said chamber and positioned entirely across said chamber near said inlet to break-up said carrier gas into minute bubbles, and a second inlet in said chamber for admitting a liquid sample into said chamber in the area between said glass frit and said outlet.

2. In a system for extracting dissolved gases from a liquid sample and subsequently analyzing the extracted gases comprising an elongated chamber, an inlet and an outlet in said chamber for connecting said chamber with a carrier gas line, a glass frit secured within said chamber and positioned entirely across said chamber perpendicular to the axis of said chamber to break-up said carrier gas into minute bubbles, and a second inlet in said chamber for admitting a liquid sample into said chamber in the area between said glass frit and said outlet.

3. In a system as claimed in claim 2 wherein said glass frit has a porosity of at least 10 microns.

4. In a system as claimed in claim 2 wherein said glass frit has a porosity of from about 10 microns to about 175 microns.

5. In a system as claimed in claim 3 wherein said chamber is provided with a drain adjacent to said frit on the outlet side thereof.

References Cited in the file of this patent
UNITED STATES PATENTS

| | | |
|---|---|---|
| 2,222,828 | Guthrie | Nov. 26, 1940 |
| 2,813,010 | Hutchins | Nov. 12, 1957 |
| 2,861,450 | Ransley | Nov. 25, 1958 |

FOREIGN PATENTS

| | | |
|---|---|---|
| 550,569 | Belgium | Dec. 4, 1959 |
| 623,550 | Canada | July 11, 1961 |

(English equivalent of Belgian Patent 550,569)

OTHER REFERENCES

Publication: Fisher Gas Partitioner, Bulletin FS 275 (1960), pages 2–7.